(12) United States Patent
Little

(10) Patent No.: US 6,527,485 B1
(45) Date of Patent: Mar. 4, 2003

(54) THREADING APPARATUS

(75) Inventor: Roger Warren Little, Santa Fe, TX (US)

(73) Assignee: Tooling Specialties, Inc., Houston, TX (US)

( * ) Notice: Subject to any disclaimer, the term of this patent is extended or adjusted under 35 U.S.C. 154(b) by 49 days.

(21) Appl. No.: 09/721,059

(22) Filed: Nov. 22, 2000

(51) Int. Cl.[7] .............................. B23F 5/00; B26D 1/12
(52) U.S. Cl. ......................................... 407/24; 407/25
(58) Field of Search ........................... 82/110; 407/103, 407/104, 113; 408/713, 187, 188

(56) References Cited

U.S. PATENT DOCUMENTS

| | | | | |
|---|---|---|---|---|
| 1,926,531 A | * | 9/1933 | Graham | 407/108 |
| 3,520,042 A | * | 7/1970 | Stier | 407/103 |
| 3,813,746 A | | 6/1974 | Price | |
| 4,230,427 A | * | 10/1980 | Belttari et al. | 407/109 |
| 4,281,430 A | | 8/1981 | Hellnick | |
| 4,320,996 A | * | 3/1982 | Roos | 407/103 |
| 4,575,888 A | | 3/1986 | Murén | |
| 4,632,608 A | * | 12/1986 | Blomberg et al. | 407/114 |
| 4,692,070 A | | 9/1987 | Shikata | |
| 4,755,085 A | * | 7/1988 | Muren et al. | 407/113 |
| 4,993,892 A | | 2/1991 | Takahashi | |
| 5,004,379 A | | 4/1991 | Little | |
| D345,985 S | | 4/1994 | Ishikawa et al. | |
| 5,505,569 A | | 4/1996 | Gustafsson et al. | |
| 5,643,523 A | * | 7/1997 | Simpson | 264/400 |
| 5,765,972 A | | 6/1998 | Ericksson et al. | |
| 5,876,154 A | * | 3/1999 | Enderle | 407/113 |
| 5,964,552 A | | 10/1999 | Larsen | |
| 6,293,738 B1 | * | 3/2000 | Hartlohner et al. | 407/114 |
| 6,168,356 B1 | * | 1/2001 | Sjoo et al. | 407/104 |
| 6,341,924 B1 | * | 1/2002 | Tagtstrom | 407/114 |

FOREIGN PATENT DOCUMENTS

EP 0119175 A1 9/1984

* cited by examiner

Primary Examiner—A. L. Wellington
Assistant Examiner—Brian Walsh
(74) Attorney, Agent, or Firm—Leon D. Rosen

(57) ABSTRACT

A triangular threading insert has a mount portion (60) with three sides forming locating faces (50, 52, 54) that lie on the three sides of an imaginary triangle (96) and has three cutting arms (21–23) with outer edges (80) for cutting threads. The outer edge of each arm projects sidewardly beyond the sides of the imaginary triangle, to leave locating faces of long length. The top face (110) of the mount portion forms a hexagon with the cutting arms projecting radially from three of the sides (71–73) of the hexagon, and with the other three sides of the hexagon extending parallel to the locating faces of the mount portion. Each locating face has a smaller height (H) than the thickness (T) of the insert, with concave border regions merging the top and bottom (124, 126) of each locating face to the top and bottom faces of the insert, and merging horizontally-spaced ends (134, 136) of each locating face to a cutting arm.

3 Claims, 2 Drawing Sheets

THREADING APPARATUS

BACKGROUND OF THE INVENTION

The economical machining of internal threads in a small diameter bore of a workpiece, can be accomplished by mounting a triangular shape insert in a corresponding pocket of a bar or the like. Then the bar is fed into the bore of the workpiece. When a cutting edge of the insert becomes worn, a fastener is loosened, the insert is rotated 120°, and the fastener is retightened with a fresh cutting edge positioned to cut a thread. The insert has a horizontal bottom surface and a pair of vertical locating surfaces that are tightly clamped to corresponding positioning surfaces in the pocket of the tool holder bar. The clamped surfaces are intended to provide stability for the insert to resist deflection and avoid vibration under the very high forces encountered during thread cutting. Although the bottom location surface comprises a large area, the side locating surfaces of prior art inserts are less than adequate due to the thread form being ground into the sides of a triangular shape insert blank. The insufficient locating surface remaining, is subjected to very high forces per unit area where it presses against corresponding positioning surfaces of the tool holder pocket. If the area of the locating surface could be increased, for a triangular insert of predetermined size (i.e. which can fit into a hole of predetermined size) then threads could be cut with a much smaller possibility of damage due to excess forces between the insert locating surfaces and the tool holder positioning surfaces.

For ease in machining, the locating surfaces on the insert and the corresponding positioning surfaces in the pocket of the tool holder are machined flat. It can be appreciated that the insert should be constructed so its locating surfaces can be easily ground precisely flat, and that the flatness and the angles between the different locating surfaces can be easily measured.

SUMMARY OF THE INVENTION

In accordance with one embodiment of the present invention, a threading insert of generally triangular shape and with three cutting arms is provided, wherein a mount portion of the insert, from which the arms project, forms long locating surfaces, where the locating surfaces can be easily precisely machined and measured. The mount portion has triangle sides lying on the sides of an imaginary triangle that has an axis, with each cutting arm extending generally radially outward from the mount portion and having an outer edge adjacent to a corner of the imaginary triangle. The outer edge of each arm has a location that projects beyond the side of the imaginary triangle. As a result, the insert of the present invention can not be readily ground from a blank of triangular shape, as in the prior art. Instead the present insert is produced from a special blank of a special preformed shape.

The locating sides at the three triangle sides of the mount each has a height less than the total height of the mount, with the top and bottom of each locating side connected by a concave border to the upper and lower faces of the mount. Also, horizontally spaced opposite ends of each locating surface are each connected by a concave border to an arm. This results in each locating face being distinctly separated from surrounding portions of the insert. The upper face of the mount portion is preferably formed in a hexagon shape with substantially equal hexagon sides.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
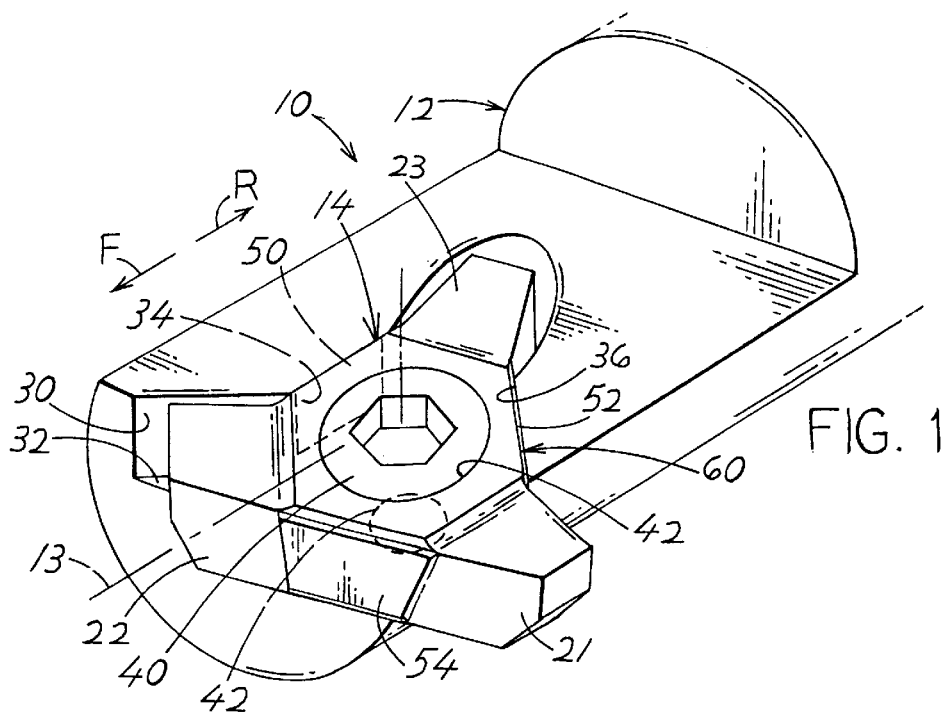
FIG. 1 is an isometric view of a threading insert and a portion of a tool holder of the present invention.

FIG. 1 illustrates a threading apparatus 10 which includes a tool holder 12 in the form of a bar with a bar axis 13 for internal threading which extends in front F and rear R directions, and an insert 14 that is mounted on the bar and that has three cutting arms 21–23. The insert is shown mounted with a first cutting arm 21 projecting from a side of the bar to cut a thread. The bar has a recess 30 that receives the insert, the recess having a flat bottom wall 32 to which the lower face of the insert is clamped, and having positioning sides or surfaces 34, 36 for accurately positioning the insert. A fastener 40 is inserted through a hole 42 in the insert and is threaded into a threaded hole 44 in the bar. The insert hole 42 has a tapered upper portion that causes the fastener to press locating sides 50, 52 on the insert against the positioning surfaces on the bar.

Figure 2:
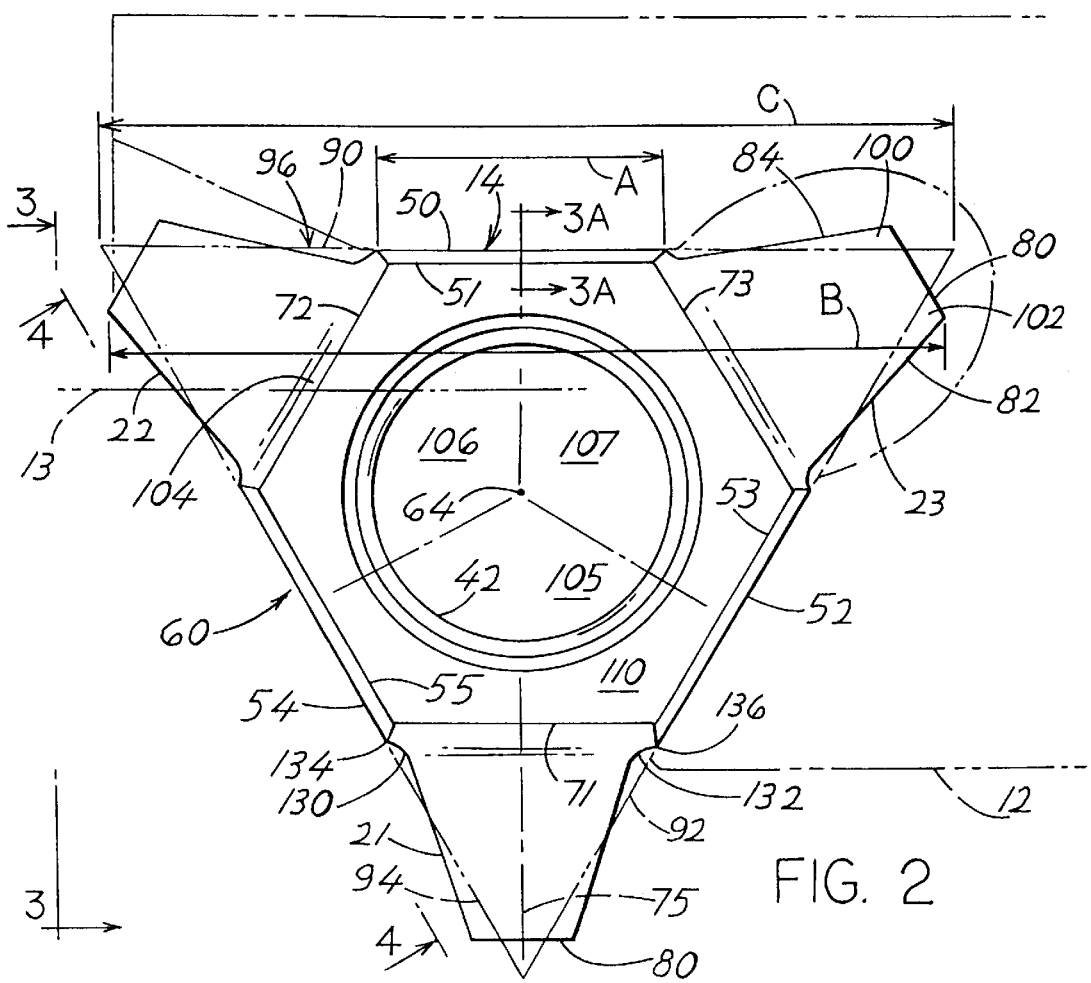
FIG. 2 is a plan view of the insert of FIG. 1, and showing a portion of the tool holder in phantom lines.

FIG. 2 shows that the insert 14 includes a mount portion 60 which forms the fastener-receiving hole 42 and the locating surfaces or sides 50, 52, 54. The insert has an axis 64 and the three cutting arms 21–23 that extend radially away from the axis, from three mount sides 71, 72, 73 of the mount portion. Each of the arms such as 23 has an outer edge 80 which is furthest from the insert axis, and has opposite arm sides 82, 84. Arm 21 extends in a direction 75 that is perpendicular to the bar axis 13. It may be noted that the particular arms shown are designed for cutting Acme threads that have shapes complimentary to the arms, but other thread designs have rounded bottoms that require arms with rounded outer edges.

The locating surfaces 50, 52, 54 lie on the sides 90, 92, 94 of an imaginary triangle 96. In accordance with one feature of the invention, the arms, and particularly the outer edges 80 have portions 100, 102 that project beyond the sides of the imaginary triangle. In the past, triangular inserts were formed by first forming a triangular blank (as by pressing and sintering microscopic particles of tungsten alloy powder in a die), with the threading insert formed by grinding away a minimum of selected areas of the blank. This left the sides of the arms within the confines of the imaginary triangle which defined the shape of the original blank. For arms of given length, this resulted in a mount portion having locating sides of small length. Locating sides of small length result in a reduced area of contact between the locating sides of the insert (e.g. 50, 52 in FIG. 1) and the positioning sides (34, 36) of the tool holder. As a result, very high forces encountered during thread cutting can result in deflection and vibration of the insert, which causes the undesirable effect of micro-chipping of the cutting edge while it is engaged in the cut. This micro-chipping leads to premature and possibly catastrophic failure of the cutting edge, resulting in possible damage to the tool holder pocket walls as well as the workpiece being machined.

Applicant constructs the insert 14 of a blank that is machined (e.g. by grinding) so the locating surfaces 50, 52, 54 lie on the imaginary triangle 96, but portions 100, 102 of the arms project beyond the sides of that imaginary triangle. A result is that the sides of the mount portion 60 that lie on the imaginary triangle and that form the locating surfaces, can be made longer and the radially inner ends 104 of the cutting arms can be made wider. The longer locating surfaces such as 50 of length A result in high forces encountered during cutting being distributed over a larger area, reducing the possibility of damage to the tool holder or insert. The wider cutting arm inner end 104 results in less possibility of break off of the arm during thread cutting. It should be noted that the insert is tri-symmetric about the axis 64, so all three 120° sectors 105–107 are identical.

Figure 3:
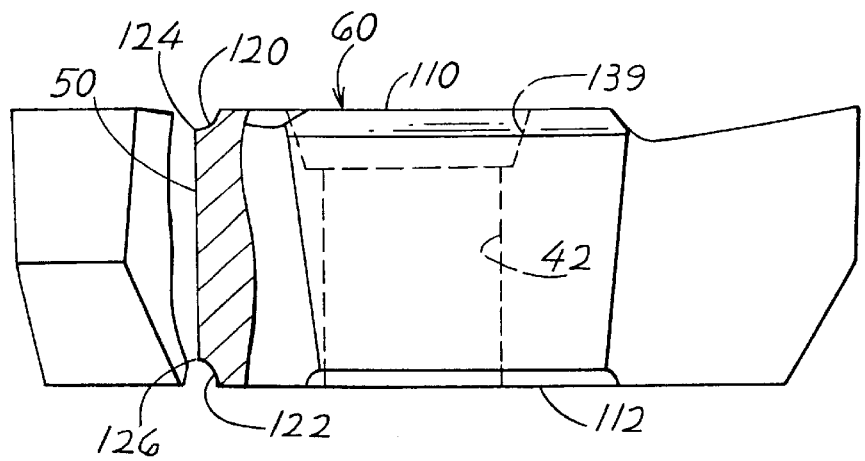
FIG. 3 is a side elevation view taken on line 3—3 of FIG. 2, and with a portion of the insert cut away to show a sectional view of the area 3A—3A of FIG. 2.
Figure 4:
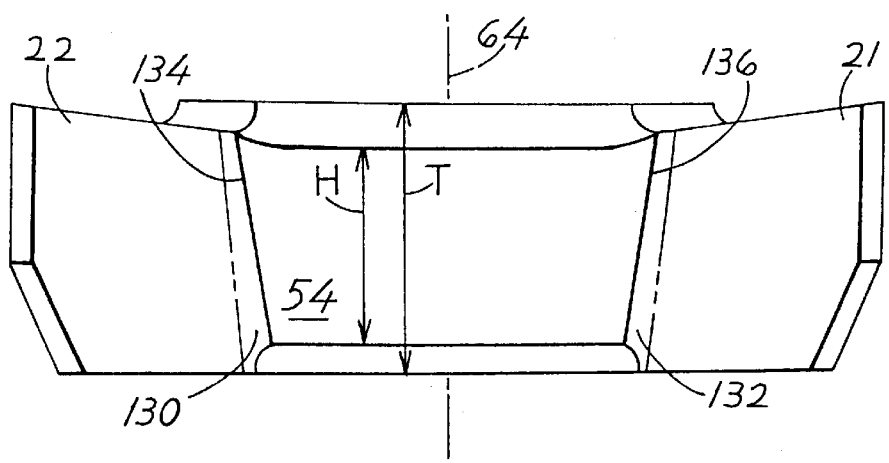
FIG. 4 is a side elevation view taken on line 4—4 of FIG. 2.

FIG. 3 is largely a view taken on line 3—3 of FIG. 2, but includes a sectional view of the portion 3A—3A of the insert of FIG. 2. The sectional view of FIG. 3 shows that the locating surface 50 is connected to upper and lower faces, or top and bottom faces 110, 112 of the mount portion 60 by horizontally elongated concave transitions, or borders 120, 122. The borders connect upper and lower ends 124, 126 of the locating surfaces to the top and bottom faces of the mount portion. FIG. 4 shows that largely vertically-extending and horizontally spaced concave transitions, or borders 130, 132 from arm inner ends and connect the horizontally spaced ends 134, 136 of the locating surface to straight portions of the adjacent arms 21, 22. The ends 134, 136 are each angled a plurality of degrees from the insert axis 64. The concave borders, including those 130, 132 (FIG. 4) at the horizontally opposite ends 134, 136 facilitate precise machining of the locating surfaces. For example, a grinding machine can move along the locating surface 54 without concern that it will grind material off the arms. The concave transitions result in sharp edges for the locating surface, which facilitate measuring those surfaces for consistency of accuracy in grinding them.

FIG. 3 shows that the fastener-receiving hole 42 has a tapered or conical upper end 139. The fastener has a tapered head that presses two locating surfaces 50, 52 (FIG. 1) on the insert tightly against the positioning surfaces 34, 36 on the tool holder.

FIG. 2 shows that edges of the upper face at 51, 53, 55 and at the mount sides, 71, 72, 73 at the upper face 110 of the mount portion lie on the sides of a hexagon. All of the sides 51, 53, 55 and 71–73 are of about the same length, in that the longest side is no more than 20% greater than the length of the shortest side, with the lengths of the sides preferably being within 10% of one another. The resulting hexagonal shape provides an enhanced appearance to the insert by making the mount portion appear to be of regular shape because all sides are of substantially equal length.

Figure 6:
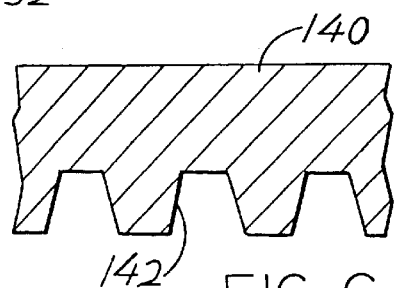
FIG. 6 is a sectional view taken on line 6—6 of the workpiece of FIG. 5.
Figure 5:
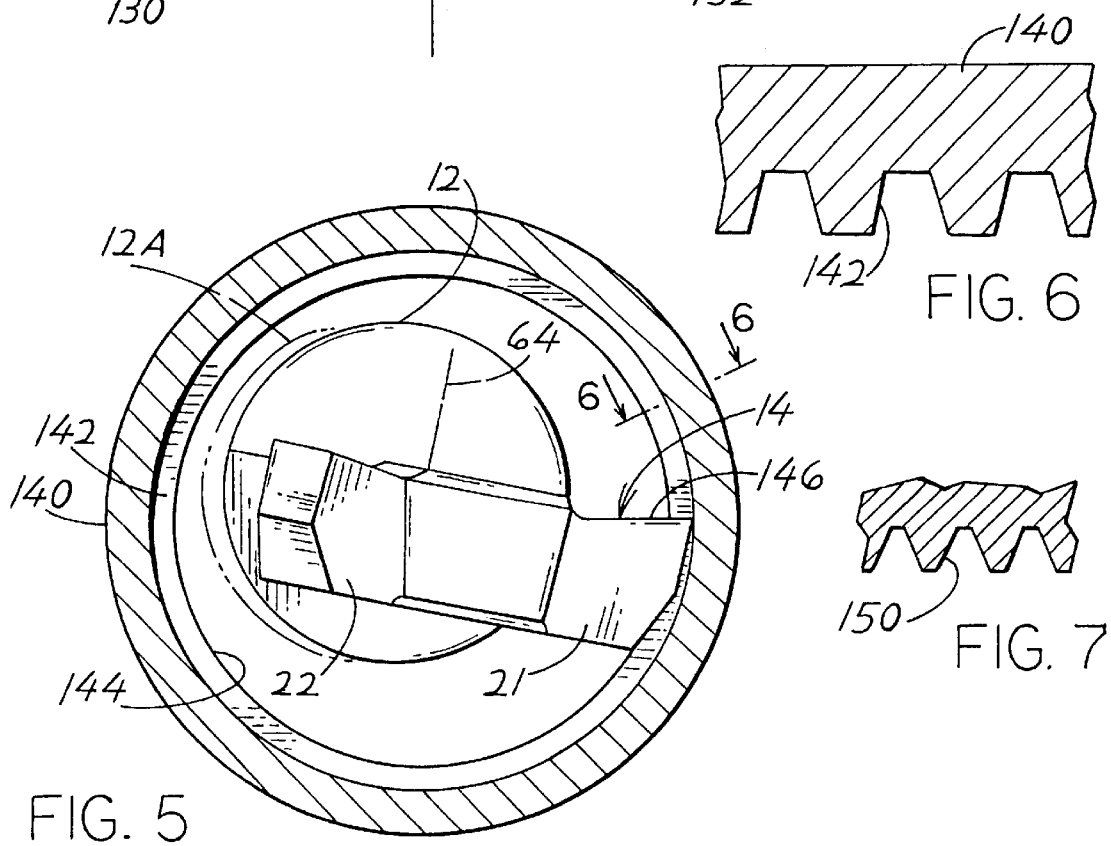
FIG. 5 is a front end view of the insert and tool holder of FIG. 1, shown inserted into a hole of a workpiece, with the thread fully cut in the workpiece and with a sectional view of the workpiece being shown.
Figure 7:
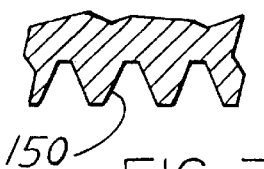
FIG. 7 is a sectional view of a portion of another workpiece, showing another thread cross-section.

FIG. 5 shows how the insert 14 is held on the bar tool holder 12 during machining of a workpiece 140 to form a thread 142 in it. The tool holder is initially inserted in the relative position 12A, and then the arm 21 is advanced into the walls of the hole or passage 144 of the workpiece to cut the thread. The axis 64 of the insert is tilted about 10° to 14° from the vertical so the upper face 146 of the cutting arm is horizontal and even with the axis of rotation of the workpiece. FIG. 6 shows the shape of the Acme thread that is cut into the workpiece. FIG. 7 shows another shape of common thread 150.

In an insert that applicant has constructed and successfully tested, the insert had an overall maximum horizontal length B (FIG. 2) of 14.8 mm, with the locating sides of the insert lying on an imaginary triangle 96 having sides of a length C of 14.9 mm. Each locating surface 50 had a horizontal length A at its top, of 5.4 mm, with the length at the bottom of the locating surface being 4.8 mm. Opposite sides of the hexagon formed at the top face of the mount were spaced by 7.7 mm, with each side of the hexagon having a length of 4.3 mm.

The insert had a thickness T (FIG. 4) of 3.93 mm, with each locating surface having a height H of 2.45 mm. The distance A (FIG. 2) along which the locating surface engages the positioning surface is about 37% of the length of the imaginary triangle side, and is preferably at least 30% of the side of the triangle at the top of the height of the locating face, and of the maximum length B of the insert.

Thus, the invention provides a threading apparatus, especially for cutting internal threads (or even grooves) in relatively small holes such as less than 30 mm, which provides large area locating surfaces with respect to the overall dimensions of the insert, and with the locating surfaces being easily manufactured with high precision. The insert has a mount portion with sides lying on an imaginary triangle, with locating surfaces on the sides of the triangle, and with arms adjacent to the corners of the triangle extending beyond the sides of the imaginary triangle. Each locating surface has top and bottom ends that are connected by elongated horizontal concave borders to the corresponding top and bottom faces of the mount portion of the insert. The mount portion has an upper face in the form of a hexagon whose six sides are of substantially uniform length.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A cutting apparatus comprising:

an insert having a mount portion with three locating sides lying on the sides of an imaginary triangle that has a triangle axis, said insert having a radially outwardly extending arm at each of three corner portions of the triangle, with each arm having an outer cutting edge and a pair of opposite arm sides that extend in a primarily radially outward direction with respect to said axis;

each of said arms has a location that projects beyond a side of said imaginary triangle;

each of the opposite arm sides at each arm has an arm side inner end (134, 136) that is furthest from the cutting edge of the arm, and each of said locating sides extends substantially straight along the entire distance between the arm side inner ends of two different arms;

said mount portion has top and bottom horizontal planar faces that are vertically spaced by a predetermined insert thickness (T), and said locating sides have planar side location faces lying in vertical planes when said triangle axis is vertical, with each locating face having a height (H) that is less than said insert thickness, and with each triangle side having horizontally-elongated borders lying between the top of the locating face and the mount portion top face, and between the bottom of the locating face and mount portion bottom face, with said borders being concave.

2. A cutting apparatus comprising:

an insert having a mount portion with three locating sides lying on the sides of an imaginary triangle that has a triangle axis, said insert having a radially outwardly extending arm at each of three corner portions of the triangle, with each arm having an outer cutting edge and a pair of opposite arm sides that extend in a primarily radially outward direction with respect to said axis;

each of said arms has a location that projects beyond a side of said imaginary triangle;

each of the opposite arm sides at each arm has an arm side inner end (134, 136) that is furthest from the cutting edge of the arm, and each of said locating sides extends substantially straight along the entire distance between the arm side inner ends of two different arms;

said mount portion has a vertically-extending locating face lying on each of said triangle sides;

each of said locating sides has horizontally-spaced and primarily vertically-extending ends, and each of said locating sides forms a primarily vertically elongated concave border where each locating face end merges with a side of one of said arms.

3. A cutting apparatus comprising:

an insert having a mount portion with three locating sides lying on the sides of an imaginary triangle that has a triangle axis, said insert having a radially outwardly extending arm at each of three corner portions of the triangle, with each arm having an outer cutting edge and a pair of opposite arm sides that extend in a primarily radially outward direction with respect to said axis;

each of said arms has a location that projects beyond a side of said imaginary triangle;

each of the opposite arm sides at each arm has an arm side inner end (134, 136) that is furthest from the cutting edge of the arm, and each of said locating sides extends substantially straight along the entire distance between the arm side inner ends of two different arms;

a bar that is elongated along a bar axis for insertion into a workpiece hole, said bar axis extending in front and rear directions, said bar having a front end with an insert-holding recess having a flat bottom wall, and said insert-holding recess having first and second positioning surfaces angled 60° from each other, with a first of said positioning surfaces angled 60° to said bar axis;

said insert lies in said insert-holding recess, with a first of said arms which is positioned to cut, projecting radial to said triangle axis and also projecting perpendicular to said bar axis, with said first arm outer edge extending parallel to said bar axis.

* * * * *